Feb. 23, 1954

A. J. SUSIL 2,670,235

AUTOMOBILE WINDOW ARMREST

Filed Sept. 25, 1950

Anton J. Susil
INVENTOR.

BY *Clarence A. O'Brien*
and *Harvey B. Jackson*
Attorneys

Patented Feb. 23, 1954

2,670,235

UNITED STATES PATENT OFFICE 2,670,235

AUTOMOBILE WINDOW ARMREST

Anton J. Susil, Edna, Tex.

Application September 25, 1950, Serial No. 186,586

2 Claims. (Cl. 296—49.2)

1

This invention comprises novel and useful improvements in an automobile window arm rest and more specifically pertains to a protector pad attachment adapted for application to an automobile window to enable the driver of the same to rest his left arm upon the window frame without experiencing the discomfort of resting the arm directly upon the metal window frame particularly in hot weather, as well as protecting the frame against the perspiration from the arm of the driver.

The present invention relates generally to that type of attachment disclosed in the prior patents of Winsor Josselyn patented on June 12, 1934, Patent No. 1,962,508; and the prior patent of Douglas Ortleb patented February 22, 1949, in Patent No. 2,462,768.

In the above mentioned prior patents, there are disclosed protecting pads and arm rests which are specifically adapted for use with conventional windows of automobiles and are adapted to be detachably mounted upon the window frame of automobile windows to provide a cushion and protective pad for seating the arm of the driver and protecting the same from the uncomfortable metallic contact of the window frame particularly in extremely hot weather, and further to protect the finish of the window frame from damage by perspiration from the arm of the driver.

It is therefore the primary object of the present invention to provide a protective pad and arm rest which may be readily mounted upon the window frames of automotive vehicles and which shall be rigid or semi-rigid in its construction in order to adapt the same for longer life while performing the desired protective and cushioning functions.

A further object of the invention is to provide an arm rest attachment for automobiles in conformity with the preceding object which shall have the necessary rigidity and strength for its intended purpose; yet shall have only cushioned surfaces engaging the trim and parts of the automobile and contacting the arm of the driver; and further which shall not interfere with the raising or lowering of the glass window of the automobile while in its mounted position thereon.

And a final important object of the invention is to provide an improved arm rest and protector pad specifically adapted for use as a removable attachment for the window frames of automotive vehicles; wherein the necessary rigidity is attained in a relatively simple, inexpensive but highly satisfactory construction; in which the top and base sections of the rest are hinged together in an improved and novel manner; and wherein the fastening means for detachably securing the device to the window frame shall form a part of a rigid member imbedded in the base member.

These, together with various ancillary features and objects of the invention which will later become apparent as the following description proceeds, are attained by the present invention, a preferred embodiment of which has been illustrated, by way of example only, in the accompanying drawings, wherein.

Figure 1:
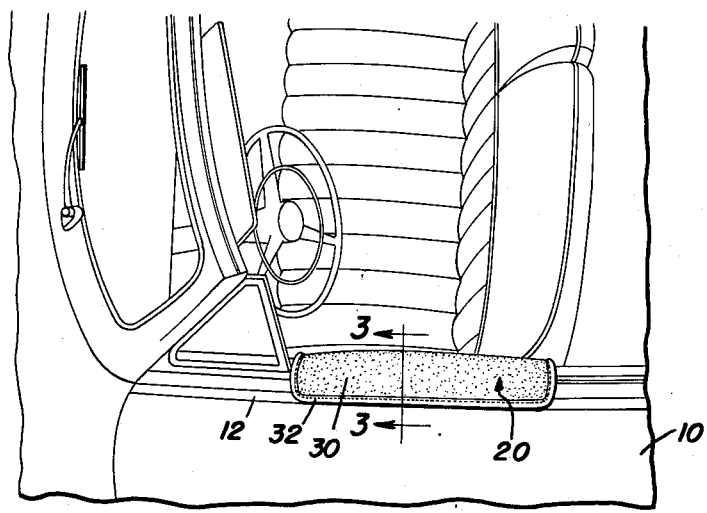
Figure 1 is a view showing in top plan a suitable embodiment of arm rests incorporating therein the principle of this invention and mounted upon the window frame of an automobile.
Figure 3:
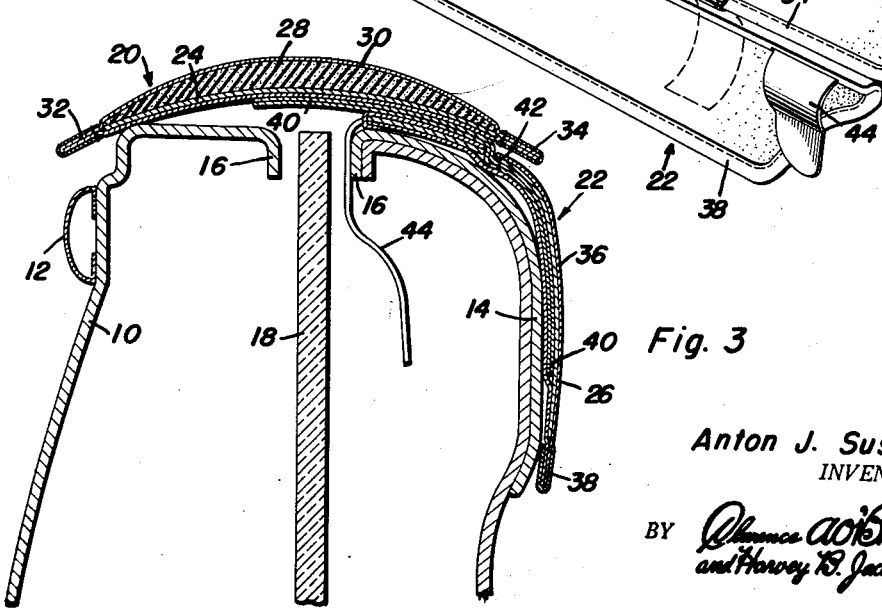
Figure 3 is a vertical transverse sectional view, taken upon an enlarged scale substantially upon the plane indicated by the section line 3—3 at Figure 1 and showing the manner in which the novel window arm rest attachment is applied to the window frame of an automobile.

Referring now more specifically to the accompanying drawings, wherein like numerals designate similar parts throughout the various views, attention is directed first to Figures 1 and 3 wherein there is shown a portion of an automobile vehicle including the window frame on the driver's side of the vehicle, this window frame being indicated generally by the numeral 10 and having an external bead or trim 12 together with a sheet metal internal trim 14, and having at its upper surface a pair of down turned ribs 16 forming therebetween an opening or channel for receiving the conventional window glass 18.

As will be readily understood, the window glass 18, is adapted to be raised or lowered through the channel formed between the down turned ribs 16 of the window glass opening through the agency of any suitable conventional window operating mechanism, not shown, it being understood that this window glass is customarily guided at vertical guide channels, not shown, for movement between the depending ribs 16 of the slot but in spaced relation to these down turned ribs.

The present invention is intended to operate in the above mentioned well known environment, and to provide an arm rest in the form of a cushion or pad which will overlie the top wall of the window frame and particularly will overlie the window glass opening in the top of the window glass when the latter is in its lowered position as shown in Figure 3, to thus comfortably support the arm of the driver and rest the same out of contact with the metallic window frame, thereby protecting the driver's arm from the discomfort of the metallic frame especially during extremely hot weather, and protect the finish of the window frame from perspiration from the driver's arm.

The novel arm rest attachment forming the subject of this invention comprises a top member indicated generally by the numeral 20, and a bottom member designated generally at 22.

Each of these members includes a rigid or substantially rigid plate which may be of sheet metal, a suitable plastic or any other desired material having the necessary rigidity and strength, these plates indicated at 24 and 26 being of sheetlike material and being slightly arcuated transverse their longitudinal axis to conform to the upper surface of the window frame and the curving trim 14 of the interior of the same.

Secured to the top surface of the rigid plate 24 of the top member, is a cushioning pad 28 which is relatively thick in its mid portion and tapers towards the sides of the same to produce a curved, wedge shaped body as illustrated in Figure 3. This cushioning pad may be of any suitable material such as foam rubber or the like, and of course may be secured to the plate 24 directly as by an adhesive or any other desired fastening means, but preferably is attached thereto by means of a covering 30 of any suitable upholstering material which embraces the top surface of the cushioning pad 28 and underlies the bottom surface of the rigid plate 24 as shown. The two longitudinal edges of this coating 30 may be joined or may be reinforced by the formation of seams or beads 32 and 34, through the use of stitching or equivalent fastening. Preferably the top member 20 is of sufficient width to completely overlie the top surface of the window frame as shown in Figure 3, and to have its seamed ends 32 and 34 extend beyond the sides of the window frame.

The base member 22 is of somewhat similar construction, including a similar construction of rigid plate 26 appropriately shaped to conform to the contour of the top end inside portion of the window frame as shown in Figure 3, this plate being enclosed in a covering 36 of any suitable upholstering material, and in this member the previously described cushioning material may be omitted if desired, as illustrated in Figure 3. The lower end of the base member 22 has the covering 36 secured as by a bead or seam 38 by means of stitching or the like.

Figure 2:
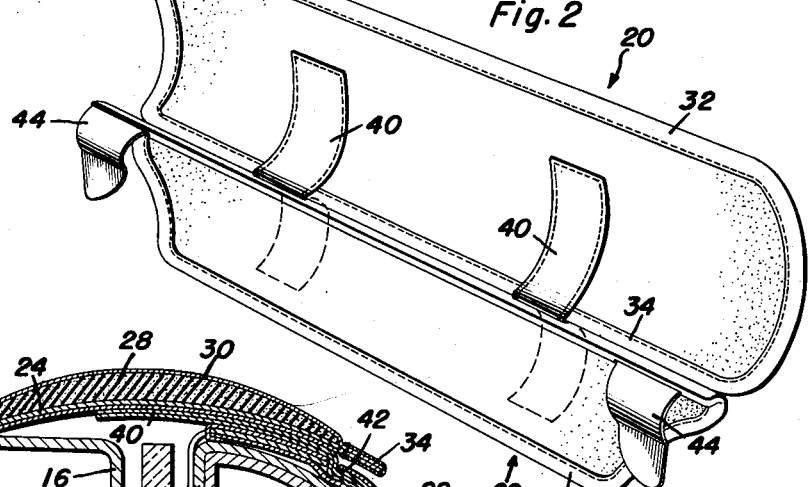
Figure 2 is a perspective view of the arm rest attachment according to this invention.

The top and base members are connected to each other for hinged movement by a pair of flexible straps which will be of fabric or any other suitable material, and which are indicated by the numerals 40. Preferably the flexible straps 40 have one end of the same secured to the under surface of the covering 30 of the top member 20 by stitching or the like, in the manner shown in Figures 2 and 3. The other ends of the flexible straps forming the hinges extend through slots in the cover 36 of the base member 22 and through slots 42 in the rigid plate 26 of the base member to underlie this rigid plate. That portion of the straps 40 which underlies the plate 26 may be directly secured to the bottom surface of the rigid plate in any desired manner, but preferably is attached to the bottom wall of the covering 36 as by stitches or the like. It will thus be apparent, by particular reference to Figure 3, that the top member is hinged to the lower member, being directly attached to the rigid plate imbedded in the bottom member, and the position in which the hinging strap extends through the slot 42 is protected by the overlying seamed portion 34 of the top member.

In order to detachably but securely anchor the device to the window frame of an automobile, the rigid plate 26 of the base member is provided with integral, angularly disposed metallic tabs constituting clips, these tabs being indicated by the numerals 44. These tabs extend through the upholstering covering 36 of the base member and are so angularly disposed that the clips may be forced down into the slot between the ribs 16 and as shown in Figure 3 will be positioned out of the path of travel of the window glass 18.

It will now be apparent the device can be readily installed when the window glass is at its lowered position by merely pressing the retaining clips 44 into the open slot between the ribs 16, at which time the resiliency of the clips will cause the base member to be snugly drawn against the trim 14 of the window frame, while the top member 20 will be positioned as shown in Figure 3 to overlie the top of the window frame.

However, when it is decided to raise the window, the upward travel of the same will slide along the concave under surface of the top member 20, cause the same to pivot about the hinge connection with the base member at the location of the slot 42 whereby the window glass may be raised without interference and without the necessity for moving the device from the window frame.

Conversely, upon lowering the window glass, the weight of the top member together with the natural resiliency of the hinge member will cause the top to lower to the position shown in Figure 3, whereby the device is again ready for immediate use by the driver.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. An arm rest for automobile windows comprising base and top members each having a rigid plate with a cushioning covering therefor, hinge means connecting said members, clips on said base member adapted for yieldable anchoring in the window glass opening of an automobile window for securing said arm rest to the window, said hinge means being disposed to one side of said opening whereby said top member may lie flat across the opening when the window glass is lowered and will be moved about its hinge means when said window glass is raised, said hinge means comprising flexible straps secured to said top member and extending into and connected to said rigid plate of the base member, said rigid plate of the base member having apertures, said straps extending through said apertures, said covering on said base member having pockets formed therein adjacent the hinged edge of said base member, said straps having ends disposed in said pockets, said pockets being on the underside of said base plate and receiving the ends of said straps after the same have been passed through the base plate apertures.

2. An arm rest for automobile windows comprising base and top members each having a rigid plate with a cushioning covering therefor, hinge means connecting said members, clips on said base member adapted for yieldable anchoring in the window glass opening of an automobile window for securing said arm rest to the window, said hinge means being disposed to one side of said opening whereby said top member may lie flat across the opening when the window glass is lowered and will be moved about its hinge means when said window glass is raised, said hinge means comprising flexible straps secured to said top member and extending into and connected to said base member, said rigid plate of the base member having apertures, said straps extending through said apertures and being connected to the base member beyond said apertures.

ANTON J. SUSIL.

References Cited in the file of this patent

UNITED STATES PATENTS

| Number | Name | Date |
| --- | --- | --- |
| 1,691,613 | Roach et al. | Nov. 13, 1928 |
| 1,962,508 | Josselyn | June 12, 1934 |
| 2,241,101 | Teeter | May 6, 1941 |
| 2,274,026 | Allen | Feb. 24, 1942 |
| 2,577,561 | Atwater | Dec. 4, 1951 |
| 2,601,052 | Ortleb | June 17, 1952 |